US006883701B2

United States Patent
Rabinkin et al.

(10) Patent No.: US 6,883,701 B2
(45) Date of Patent: Apr. 26, 2005

(54) IRON-CHROMIUM BASE BRAZING FILLER METALS

(75) Inventors: Anatol Rabinkin, Morris Plains, NJ (US); Nicholas J. DeCristofaro, Chatham, NJ (US)

(73) Assignee: Metglas, Inc., Conway, SC (US)

( * ) Notice: Subject to any disclaimer, the term of this patent is extended or adjusted under 35 U.S.C. 154(b) by 0 days.

(21) Appl. No.: 10/725,265

(22) Filed: Dec. 2, 2003

(65) Prior Publication Data

US 2004/0108366 A1 Jun. 10, 2004

Related U.S. Application Data

(62) Division of application No. 10/171,132, filed on Jun. 13, 2002, now Pat. No. 6,656,292.

(51) Int. Cl.[7] .................. B23K 31/02; B23K 35/34; B21D 53/02; B23P 15/26
(52) U.S. Cl. .............. 228/183; 29/890.03; 29/890.054; 148/24; 420/50; 428/680; 428/681
(58) Field of Search .................. 228/183, 262.1; 29/890.03, 890.054; 148/24, 325; 420/50, 64; 428/680, 681

(56) References Cited

U.S. PATENT DOCUMENTS

| 4,379,121 | A | | 4/1983 | McMurray et al. |
| 4,394,349 | A | | 7/1983 | Cartmell |
| 4,402,742 | A | * | 9/1983 | Pattanaik ...................... 420/50 |
| 4,410,604 | A | * | 10/1983 | Pohlman et al. ............. 428/681 |
| 4,543,135 | A | | 9/1985 | Bose et al. .................. 148/403 |
| 4,576,873 | A | * | 3/1986 | Bose et al. .................. 148/403 |
| 5,158,229 | A | | 10/1992 | Bose et al. ............. 228/263.13 |
| 5,316,997 | A | | 5/1994 | Toyoda et al. |
| 5,487,865 | A | * | 1/1996 | Hampton et al. ............... 419/5 |
| 6,165,290 | A | | 12/2000 | Rabinkin ...................... 148/403 |
| 6,200,690 | B1 | | 3/2001 | Rabinkin ...................... 428/606 |
| 6,242,113 | B1 | * | 6/2001 | Kiser ........................... 428/680 |
| 6,493,936 | B2 | * | 12/2002 | Doi et al. .................. 29/889.7 |
| 6,544,662 | B2 | | 4/2003 | Rabinkin et al. |
| 6,656,292 | B1 | * | 12/2003 | Rabinkin et al. ............. 148/24 |
| 2004/0056074 | A1 | * | 3/2004 | Sjodin ......................... 228/183 |

FOREIGN PATENT DOCUMENTS

| EP | 0342 545 | 11/1989 | ..................... 35/30 |
| EP | 0 418 606 A1 | 3/1991 | ....................... 35/2 |
| WO | WO97/34732 | 9/1997 | ..................... 35/30 |
| WO | WO02/22299 A1 | 3/2002 | ......................... 1/0 |
| WO | WO02/38327 A1 | 5/2002 | ..................... 35/30 |

OTHER PUBLICATIONS

N. DeCristofaro and D. Bose "Brazing and Soldering With Rapidly Solidified Filler Metals", American Society for Metals, Feb. 1986, 415–424.

N. DeCristofaro and C. Henschel Metglas® Brazing Foil, *Welding Journal*, Jul. 1978.

* cited by examiner

*Primary Examiner*—L. Edmondson

(57) ABSTRACT

A plurality of parts are brazed using an iron/chromium filler metal. The parts are preferably composed of stainless steel. The brazed assembly forms a heat exchanger characterized by good corrosion resistance and low rates of leaching of Ni, which are further improved by a post-brazing conditioning step in an oxygen-containing atmosphere at a temperature of about 150° to 600° C. The preferred brazing filler metal consists essentially of a composition having the formula $Fe_aCr_bCo_cNi_dMo_eW_fB_gSi_h$ wherein the subscripts are in atom percent and total 100%, "b" is about 5 to 20, "c" ranges from 0 to about 30, "d" is 0 to about 20, "e" is 0 to about 5, "f" is 0 to about 5, "g" is about 8 to 15, "h" is about 8 to 15, the balance being incidental impurities of up to about 1 percent by weight of the total composition.

18 Claims, 3 Drawing Sheets

IRON-CHROMIUM BASE BRAZING FILLER METALS

RELATED U.S. APPLICATION DATA

This application is a divisional of U.S. patent application Ser. No. 10/171,132, filed Jun. 13, 2002, now U.S. Pat. No. 6,656,292.

BACKGROUND OF THE INVENTION

1. Field of the Invention

This invention relates to brazing of metal parts; and more particularly, to a homogeneous, ductile iron-chromium-based brazing material useful in brazing stainless steels, and a method for brazing stainless steel components to form articles of manufacture that reduces the propensity of nickel to leach from such articles in water.

2. Description of the Prior Art

Brazing is a process for joining metal parts, often of dissimilar composition, to each other. Typically, a filler metal that has a melting point lower than that of the metal parts to be joined together is interposed between the metal parts to form an assembly. The assembly is then heated to a temperature sufficient to melt the filler metal. Upon cooling, a strong, leak-tight joint is formed. The assembled parts may either constitute a finished article of manufacture or they may form a sub-component for use in a further manufacturing operation.

The selection of a particular brazing filler metal for a specific application depends on a variety of factors, including requirements related to the components to be joined and to the conditions under which the assembly ultimately must operate.

One basic consideration is temperature. Brazing filler metals are characterized by their solidus and liquidus temperatures. The term "solidus" refers to the highest temperature at which a metal or alloy is completely solid, and the term "liquidus" refers to the lowest temperature at which the metal or alloy is completely liquid. In any brazing process, the brazing filler metal must possess a solidus temperature that is high enough to provide the brazed assembly with adequate integrity to meet the desired service requirements and yet have a liquidus that is low enough to be compatible with the temperature capabilities of the parts being joined.

Another consideration is corrosion resistance. Many brazed assemblies must operate under environmental conditions that are conducive to corrosion, especially in the vicinity of the brazement. The propensity of a given system to corrode is strongly influenced by the gases or liquids to which the system is exposed and by typical operating temperatures.

One class of devices which are frequently assembled using brazing as a joining technique is heat exchangers. These devices are known in a variety of configurations. Generally stated, heat exchangers allow heat to be transferred across an interface that separates one circulating fluid from another circulating fluid. It is generally essential that the fluids, either of which can be gaseous or liquid, be kept separate. Hence, it is critical that brazed joints which define, at least in part, the interface maintain structural integrity under a full range of operating conditions and for a prolonged service life.

One field of use wherein heat exchangers find utility is in the processing of materials which are ultimately intended for human ingestion and consumption. These include foodstuffs, as well as fluids such as water, beverages, juices, and the like. The metallic materials used for the construction of heat exchangers appointed for such applications are of critical importance. They not only need to provide excellent operative characteristics with regard to heat transfer, but also must be compatible with the substances to which they are exposed. One particular concern is the requirement that there be no undesired leaching or elution of any elemental or molecular component species of the materials of construction that is harmful or adds undesirable taste to the fluids. If a harmful species or an undesirable taste is present, then it is imperative that any leaching of causative materials be minimized. Frequently, local governmental or regulatory authorities have established maximum amounts of materials, such as metal ions, which may be permitted to leach into fluids passing therethrough. The standard is ordinarily expressed as a maximum amount of leachate that may be present per unit volume of the fluid processed. Ideally, the materials incorporated in heat exchangers (including brazing filler metals) and the associated manufacturing methods result in a device that meets or exceeds applicable regulatory standards under foreseeable operating conditions.

Heat exchangers of the "shell-and-tube," "plate/plate," and "plate/fin" types are most usually encountered. In the first configuration, a larger diameter housing typically referred to as a "shell" encompasses one or more small diameter tubes or pipes. According to this configuration, a first fluid (i.e., liquid, gas) passes through the shell and about the exterior of the tubes while simultaneously, a second fluid (liquid, gas) passes through the interior of the tubes. While no physical contact is permitted between the first and second fluids, heat transfer occurs across the walls of the tubes from the hotter fluid to the cooler fluid. In plate/plate and plate/fin type heat exchangers, again a physical member, namely one or more plates separate a first fluid from a second fluid while heat transfer occurs across the plate. In these types of heat exchanger (as well as in other assemblies), metals are most commonly used due to their high strength and good heat transfer characteristics. Typically, the individual parts, which are used to make up these types of heat exchangers, are joined by brazing. It is imperative that the heat exchanger maintain its physical integrity and the isolation of the fluids from each other and the outside world. In addition, the heat exchanger and the joints that secure its internal components must be resistant to any potential detrimental effects which might result from contact with one or both of the fluids.

To minimize this undesired technical effect, the materials of construction for heat exchangers, particularly those used for foodstuffs, need to be very carefully selected. Stainless steels, which contain up to about 20% Ni, are very commonly encountered, for they exhibit desirable properties including low leaching rates into fluids or gases, and generally good corrosion resistance. However, brazing manufacturing processes carried out at high temperatures may also adversely affect the propensity of the stainless steels to leach. Previously, elemental copper was used as a brazing filler metal as such featured low leaching of nickel into fluids, especially water. However, the corrosion resistance of heat exchangers having components brazed using copper as brazing filler metal is poor. Typically these heat exchangers required frequent replacement, resulting in significant costs for the replacement device and the associated labor, as well as economic losses resulting from manufacturing downtime. To improve corrosion resistance, it was recently found that brazing filler metals with compositions based primarily on nickel and chromium ("Ni/Cr") could be employed to join stainless steel parts used in such assemblies. Unfortunately, it was also found that when such Ni/Cr-based brazing filler metals were used, an undesirably high amount of nickel often leached into water or other fluids flowing through these assemblies.

Inasmuch as such Ni/Cr-based brazing filler metals include a significant proportion of nickel, they are believed to be the source of the undesired nickel leachate. For this reason, use of Ni/Cr-based brazing filler metals should be avoided in applications where nickel leaching into a fluid presents a concern, as is the case when materials are appointed to be used for human ingestion or consumption. Not surprisingly, governmental regulations in some countries have imposed strict limitations on the amount of nickel which may be leached into these fluids. It is to one or more of these technical needs that the present invention is directed.

SUMMARY OF THE INVENTION

The present invention provides a method for fabricating heat exchangers and other articles of manufacture by brazing components thereof with an iron/chromium brazing filler metal. Brazed assemblies advantageously exhibit good general corrosion resistance and low rates of leaching of nickel into fluids passing through either side of the heat exchanger. As a result, the heat exchanger is highly suited for exposure to items intended for ingestion by humans or animals.

In a first aspect, the present invention provides a method for the manufacture of assemblies, especially those which include parts made of stainless steels. These assemblies comprise parts joined using iron/chromium-based brazing filler metals. When manufactured, the assemblies are characterized by general corrosion resistance and by low leaching rates of nickel. The method comprises the steps of: (a) juxtaposing at least two parts to define one or more joints therebetween; (b) supplying to the one or more joints an iron/chromium brazing filler metal; (c) heating the juxtaposed parts and the brazing filler metal under appropriate conditions in order to cause the melting of the brazing filler metal; and (d) cooling the melted brazing filler metal to produce a brazed joint. The heating and cooling steps are preferably carried out either in a protective gas atmosphere or in vacuum.

In a second aspect, the present invention relates to a method for the manufacture of a heat exchanger or other manufactured assembly which method includes a brazing step in which the alloys of the present invention are used, as well as a post-brazing conditioning step for treating the brazed heat exchanger. The conditioning step comprises exposing the brazed joints to an elevated temperature, in an oxygen-containing atmosphere, for a sufficient time to form a protective oxide layer to substantially reduce the amount of nickel leaching into water or other fluids contacting the brazed joints of the brazed assembly. Preferably the conditioning step is carried out in air and at a temperature ranging from about 150° to 600° C. More preferably, the conditioning is done at a temperature ranging from about 150° to 400° C. The manufactured heat exchangers are characterized by general corrosion resistance and by reduced leaching rates of nickel into fluids passed through the heat exchanger.

In a third aspect of the invention, there are provided manufactured assemblies which comprise parts joined by iron/chromium-based brazing filler metals, wherein the assemblies are characterized by general corrosion resistance and by reduced nickel leaching rates.

In a fourth aspect, there is provided an iron/chromium-based brazing filler metal alloy. Preferably the iron/chromium-based brazing filler metal consists essentially of a composition having the formula $Fe_aCr_bCo_cNi_dMo_eW_fB_g\text{-}Si_h$ wherein the subscripts "a", "b", "c", "d", "e", "f", "g", and "h" are all in atom percent and wherein, "b" is between about 5 and 20, "c" is between 0 and about 30, "d" is between 0 and about 20, "e" is between 0 and about 5, "f" is between 0 and about 5, "g" is between about 8 and 15, "h" is between about 8 and 15, the sum "a"+"b"+"c"+"d"+"e"+"f"+"g"+"h"=100, and incidental impurities and other elements are optionally present in an amount up to about 1 percent by weight of the total composition. The preferred iron/chromium brazing filler metal is especially suited for fabricating heat exchangers and other assemblies of the invention which exhibit low Ni leaching rates. It is preferred that the iron/chromium brazing filler metal be prepared in the form of a homogeneous, ductile ribbon or strip.

The alloys of the present invention contain substantial amounts of boron and silicon, which are present in the solid state in the form of hard and brittle borides and silicides. Accordingly, the alloys of the invention are especially suited for fabrication into flexible thin foil by rapid solidification techniques. Foil produced in this manner is composed of a metastable material having at least 50% glassy structure and a thickness ranging from about 0.0007 to 0.002 inches (18–50 μm). Use of a thin flexible and homogeneous foil as filler metal is especially beneficial for brazements wherein the mating surfaces have wide areas with narrow clearances and for brazing joints having complex shapes. The alloys of the invention can also be produced in powder form by gas or water atomization of the alloy or by mechanical comminution of a foil composed thereof. Other methods, such as rolling, casting, and other powder metallurgical techniques can be also be used to prepare these alloys.

Further aspects and features of the invention will become more apparent from the following description.

BRIEF DESCRIPTION OF THE DRAWINGS

The invention will be more fully understood and further advantages will become apparent when reference is had to the following detailed description of the various embodiments of the invention and the accompanying drawings, wherein like reference numeral denote similar elements throughout the several views and in which.

DETAILED DESCRIPTION OF THE PREFERRED EMBODIMENTS

The present invention is directed to methods for the manufacture of assemblies which include brazed metal components, wherein the manufactured assemblies are advantageously characterized by low leaching rates of nickel into fluids which flow through the manufactured assembly and general corrosion resistance. The invention further provides an FeCr-base brazing filler metal suitable for this manufacturing process.

In accordance with the invention there is provided a brazing filler metal consisting essentially of a composition having the formula $Fe_aCr_bCo_cNi_dMo_eW_fB_gSi_h$, wherein the subscripts "a", "b", "c", "d", "e", "f", "g", and "h" are in atom percent, "b" ranges from about 5 to 20, "c" ranges from 0 to about 30, "d" ranges from 0 to about 20, "e" ranges from 0 to about 5, "f" ranges from 0 to about 5, "g" ranges from about 8 to 15, "h" ranges from about 8 to 15, the sum "a"+"b"+"c"+"d"+"e"+"f"+"g"+"h"=100, the balance being incidental impurities present in an amount ranging up to about 1 percent by weight of the total composition.

In any brazing process, the brazing filler metal must have a melting point high enough to provide joint strength meeting service requirements of the brazed metal parts. Too high a melting point may weaken or sensitize the base metal. Additionally, too high a melting point may erode the base metal in the vicinity of the joint region. A filler material must also be compatible, both chemically and metallurgically, with the materials being brazed.

Iron/chromium-based brazing filler metals particularly useful in the methods and assemblies of the present invention are metal alloys which can be produced in various forms, including but not limited to powders, foils, ribbons and wires, according to well known techniques. Methods commonly used to fabricate alloys in powder form include gas or water atomization as well as mechanical pulverization. Alloys of the present invention are most preferably formed into ductile foils, ribbons or wire by rapid solidification. Production of metal alloys by rapid solidification typically entails quenching a melt of the requisite composition by rapidly cooling at a rate of at least about $10^{3\circ}$ C./sec, although higher rates are known and more commonly used. Of the rapid solidification processes available today, the most preferred process employs a rapidly rotating chill wheel onto which a molten alloy is impinged and cast into wide ribbon. One such process suitable for the manufacture of the brazing filler metal of the invention as wide, ductile ribbon is disclosed by U.S. Pat. No. 4,221,257.

Ideally, the iron/chromium-based brazing filler metal of the present invention is in the form of a ductile foil which can be readily handled. In this form the iron/chromium-based brazing filler metal of the invention is conveniently prepared in a variety of shapes that conform to contours used in the assembly of complex part assemblies. Formation into complex shapes can occur by bending or stamping the ductile foil.

It is preferred that the brazing foil of the invention should be essentially homogeneous in its composition, that is to say that it contains no binders, such as organic binders which would provide the potential for void formation or the deposition of contaminating residues during brazing. The homogeneous composition of the foil results in liquidus and solidus temperatures that are uniform throughout, further promoting uniform melting and the formation of a strong, uniform, void-free brazed joint.

Rapidly solidified products produced from homogeneous melts of the alloys are usually homogeneous in the solid state. The products may be glassy or crystalline depending upon the alloy compositions and processing parameters. In addition, products at least 50% glassy usually exhibit sufficient ductility to enable foil, ribbon and wire forms of the alloys to be bent to a radius as small as ten times their thickness without fracture. Preferably, the iron/chromium-based brazing filler metals of the present invention are metal alloys which are formed by rapidly solidifying a melt of the metal alloy at quenching rates of at least about $10^{5\circ}$ C./sec. Such quenching rates typically produce alloys which are at least about 50% glassy and, as a result, are sufficiently ductile so as to enable them to be stamped into complex shapes. More preferably, the alloys of the present invention are at least about 80% glassy. Most preferably the alloys are substantially fully glassy (i.e., at least 90% glassy) and thus exhibit the highest degree of ductility.

The alloys provided by the present invention are particularly suited for use as brazing filler metals in the methods described herein. Most preferably, the alloys are produced in foil form and are useful regardless of whether the foil is glassy or microcrystalline. Alternatively, the alloys may be prepared in the form of a foil with a crystalline solid solution or glassy metal structure, and in both cases may be heat treated to obtain therein a fine-grained crystalline structure that promotes longer die life when stamping of complex shapes is contemplated. The foils of the present invention typically are between about 0.0007 inches and about 0.002 inches (about 18 to 50 micrometers) thick. In many instances, the foil thickness corresponds approximately to the desired gap between parts to be brazed.

The brazing filler metals of the present invention are particularly useful for the joining of metal parts, and particularly stainless steel parts. Stainless steels are most frequently used in processing of fluids, including foodstuffs such as juices or other beverages, such as water, which are ultimately intended for human consumption. Exemplary grade of such stainless steels includes: steel S31603 according to UNS Classifications, as well as type 316L stainless steel, which is described as typically containing approximately 0.03 wt. % carbon, 2.00 wt. % manganese, 1.0 wt. % silicon, 16 to 18 wt. % chromium, 10 to 14 wt. % nickel, 2 to 3 wt. % molybdenum, 0.1 wt. % nitrogen and iron as the balance to 100 wt. %. It is contemplated that other materials benefiting from the teaching herein can also be used in accordance with the invention to afford reduced nickel leaching rates and increased corrosion resistance. By way of non-limiting example these materials include other grades of stainless steel, as well as other corrosion resistant alloys such as those including nickel or chromium.

A more preferred brazing filler metal of the invention consists essentially of a composition having the formula $Fe_aCr_bCo_cNi_dMo_eW_fB_gSi_h$, wherein the subscripts "a", "b", "c", "d", "e", "f", "g", and "h" are in atom percent, "b" ranges from about 5 to 10, "c" ranges from 0 to about 10, "d" ranges from 0 to about 10, "e" ranges from 0 to about 3, "f" ranges from 0 to about 3, the sum "g"+"h" ranges from about 18 to 25, and the sum "a"+"b"+"c"+"d"+"e"+"f"+"g"+"h"= 100, the balance being incidental impurities present in an amount ranging up to about 1 percent by weight of the total composition. The preferred brazing filler metal is readily quenched into a highly ductile metal strip and exhibits low liquidus temperatures. Moreover, heat exchangers and other similar assemblies brazed using the preferred brazing filler metal are characterized by advantageously low rates of Ni leaching and by general corrosion resistance.

In another aspect of the invention, there is provided a method for the manufacture of devices such as heat exchangers and other equipment comprising brazed parts. The devices are appointed for the processing of materials for human ingestion or human consumption and are characterized by reduced leaching rates of nickel into fluids in contact with the devices. The method includes a brazing step, as well as an optional post-brazing conditioning step for treating the devices. The method includes the steps of: (a) juxtaposing at least two parts to define one or more joints therebetween; (b) supplying to the one or more joints an iron/chromium brazing filler metal; (c) heating the juxtaposed parts and the brazing filler metal under appropriate conditions in order to cause the melting of the brazing filler metal; and (d) cooling the juxtaposed parts and the melted brazing filler metal to produce at least one solid brazed joint.

Figure 1:
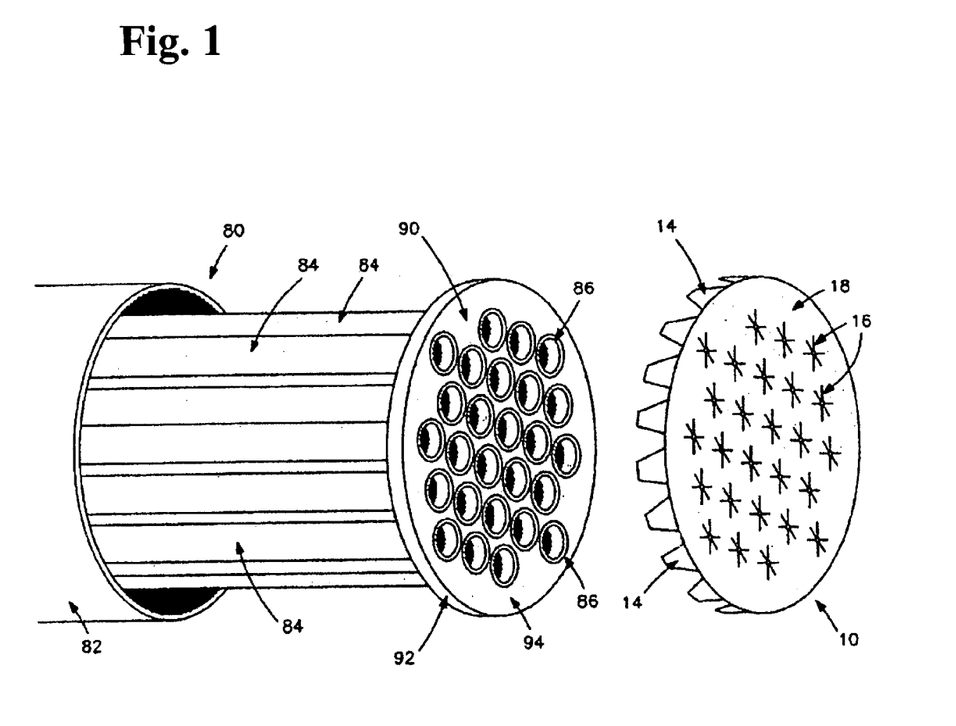
FIG. 1 is a perspective view of a portion of a conventional shell-and-tube heat exchanger in a partially disassembled state, along with a brazing foil preform adapted for use in brazing the components of the heat exchanger.

Referring now to FIG. 1 there is depicted in a partially disassembled state a portion of a heat exchanger 80 of conventional shell-and-tube form. The heat exchanger 80 comprises a shell 82 and a plurality of tubes 84, each having an end 86 extending through a suitably dimensioned passage through a plate 90. In operation one fluids flows through tubes, while another flows through the inside portion of shell 82 not occupied by tubes 84. Heat is exchanged in a conventional manner across the interface defined by the combined external surface area of tubes 84 located within shell 84. The diameter of the plate 90 is dimensioned to be fittable within the inside diameter of the shell 82. Edge 92 of plate 90 is preferably formed with a slight taper to facilitate its insertion into shell 82 during assembly. It is also contemplated that the outer diameter of the plate 90 should have a small clearance relative to the inner diameter of the shell 82. This clearance between the shell 82 and the plate 90 is usually at least slightly larger than the thickness of the brazing foil preform 10. The reason for this clearance is that it is contemplated that the tabs 14 depending from the major planar face 18 of the preform 10 are placed to be in contact with the edge 92 of the plate 90 prior to the brazing operation. Similarly, the perforations 16 present and passing through the planar face 18 are also dimensioned and arranged such that they coincide with the placement and dimensions of the ends of the tubes 86.

In one aspect, the assembly of heat exchanger 80 comprises the steps of: positioning brazing foil preform 10 against the primary face 94 of plate 90; folding tabs 14 to contact or at least to extend along side the tapered edge 92; orienting preform 10 such that perforations 16 correspond suitably with positioned tube ends 86 and the plate 90. Thereafter, this assemblage can be inserted into the shell 82; and brazing the assemblage in accordance with the specific requirements necessary for the materials of construction of the assembly, and with regard to the Fe/Cr brazing filler metal of which brazing preform 10 is composed.

Figure 2:
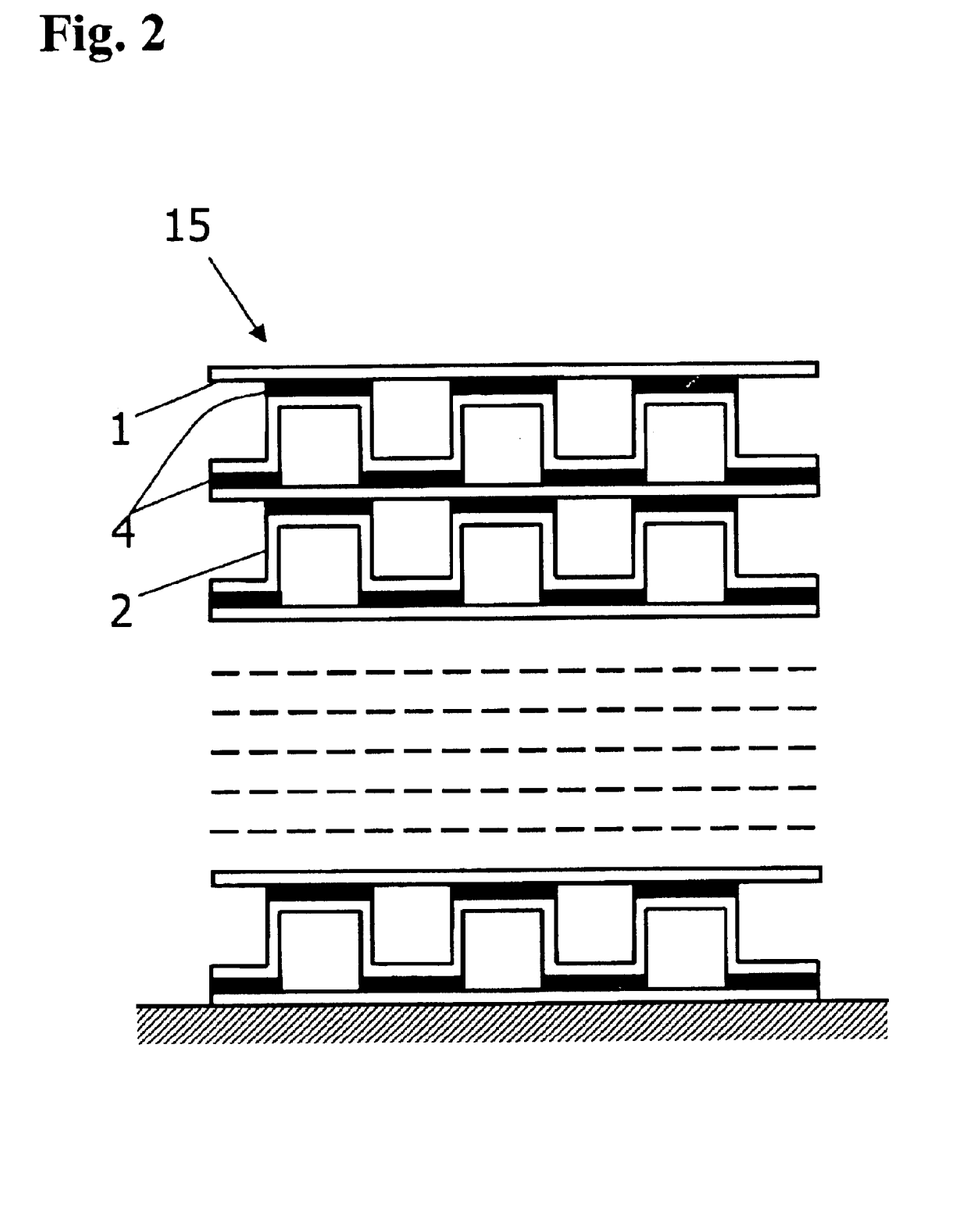
FIG. 2 is a cross-sectional view of a heat exchanger of the plate and fin type brazed using Fe/Cr brazing filler metal.

FIG. 2 depicts a heat exchanger 15 of the plate-fin type, comprising a plurality of plates 1 and fins 2. The assembly of heat exchanger 15 comprises the steps of: preparing a requisite number of preforms, each being a suitably dimensioned sheet of brazing filler metal composed of an Fe/Cr brazing filler metal; and disposing a preform between each of the adjacent fins and plates to be joined by brazing. This assemblage is then brazed in accordance with the specific requirements necessary for the materials of construction of the assembly, and with regard to the Fe/Cr brazing filler metal of which the brazing preform is composed. After completion of the brazing operation a fillet 4 of the brazing filler metal is present in the substantially the full area of contact between adjacent plates 1 and fins 2.

Figure 3:
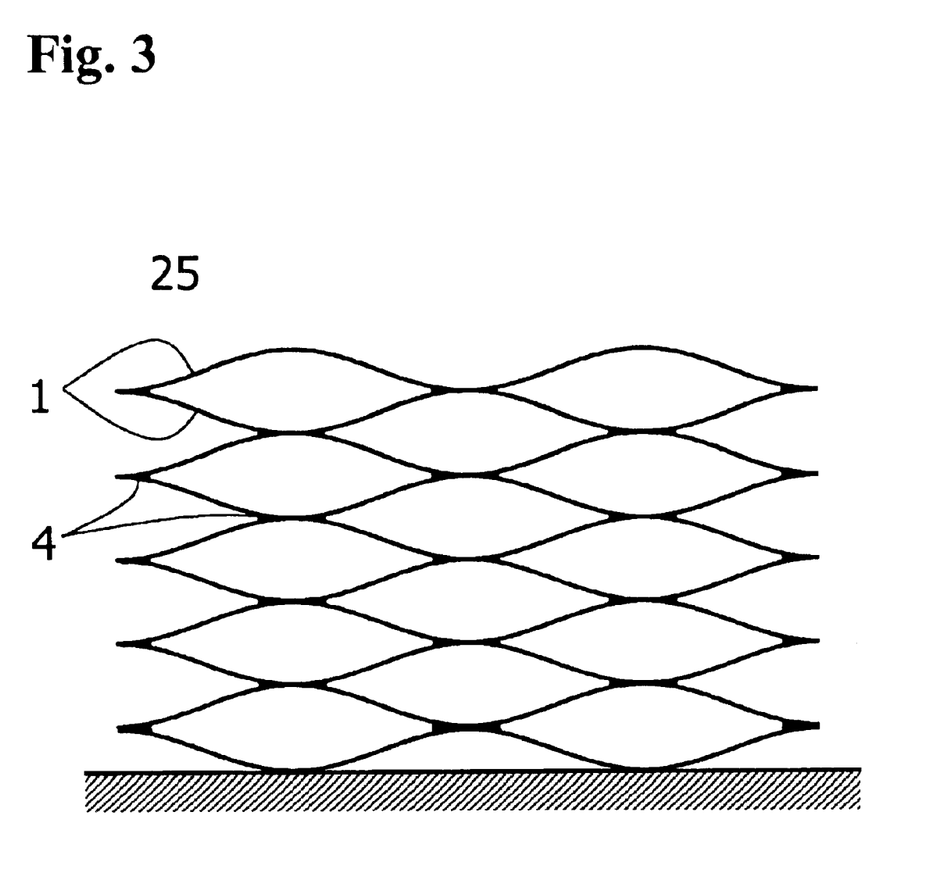
FIG. 3 is a cross-sectional view of a heat exchanger of the plate—plate type brazed using Fe/Cr brazing filler metal.

FIG. 3 depicts a heat exchanger 25 of the plate-plate type, comprising a plurality of plates 1. The assembly of heat exchanger 25 comprises the steps of: preparing a requisite number of preforms, each being a suitably dimensioned sheet of brazing filler metal composed of an Fe/Cr brazing filler metal; and disposing a preform between each of the adjacent plates 1 to be joined by brazing. This assemblage is then brazed in accordance with the specific requirements necessary for the materials of construction of the assembly, and with regard to the Fe/Cr brazing filler metal of which brazing preform is composed. After completion of the brazing operation a fillet 4 of the brazing filler metal is present in substantially the full area of contact between adjacent plates 1.

The method of the invention optionally includes a further step of: conditioning the brazed parts by exposing at least each of the brazed joints to an elevated temperature ranging from about 300° C. to about 600° C. in an oxygen-containing atmosphere for a sufficient time to form a protective oxide layer that substantially reduces the amount of nickel leaching into water or other fluids contacting the brazed joints of the brazed assembly. The exposure time preferably ranges from about 8 to 24 h.

Preferably the optional conditioning step is carried out in air and at a temperature ranging from about 300° C. to 600° C. and, more preferably, at a temperature ranging from about 350° C. to 500° C.

In a preferred embodiment of the method described above, the iron/chromium-based brazing filler metal consists essentially of a composition having the formula $Fe_aCr_bCo_cNi_dMo_eW_fB_gSi_h$ wherein the subscripts "a", "b", "c", "d", "e", "f", "g", and "h" are in atom percent and wherein, "b" ranges from about 5 to 20, "c" ranges from 0 to about 30, "d" ranges from 0 to about 20, "e" ranges from 0 to about 5, "f" ranges from 0 to about 5, "g" ranges from about 8 to 15, "h" ranges from about 8 to 15, and the sum "a"+"b"+"c"+"d"+"e"+"f"+"g"+"h"=100, the balance being incidental impurities present in an amount ranging up to about 1 percent by weight of the total composition.

Preferably in the process described above the heating and cooling of the juxtaposed parts to cause the brazing thereof occurs in a closed oven in the presence of a protective gas such as argon, helium, or nitrogen. Alternately, heating and cooling may occur in a closed oven under vacuum conditions as well, and in certain instances, such conditions are preferred. These brazing conditions are typically used in industry to achieve a high joint strength and integrity when using filler metals containing oxygen-active elements such as boron, silicon, and phosphorus. During the brazing cycle the parts and joint surfaces which are present under vacuum conditions or are under a protective atmosphere are believed to acquire a thin layer of iron-chromium oxide when exposed to the ambient atmosphere. The iron-chromium oxide layer provides a sufficient barrier to protect against general corrosion and against partial leaching of nickel from the brazed joint into a fluid passing through an assembly.

The iron-chromium oxide layer may be further enhanced by an additional step wherein an assembly, such as a heat exchanger or other device is maintained in an oxygen-containing atmosphere, such as air, at an elevated temperature for a sufficient time in order to provide for the additional buildup of the surface oxide layer. Preferably, this step comprises exposing the brazed assembly to a temperature of from about 150° C. to about 600° C. under an oxygen-containing atmosphere, preferably air, for a sufficient time to sufficiently oxidize the brazed joint of the assembly. While it will be understood that the optimal treatment conditions depend upon the type and size of the assembly being treated, the optimal treatment conditions for a particular assembly may be determined by routine experimentation, such as by varying the time and temperature of the exposure to the elevated temperature.

Manufactured assemblies, and especially heat exchangers manufactured according to the methods described herein are characterized by reduced leaching rates of nickel into water-based fluids passed therethrough when compared to assemblies manufactured in accordance with known methods comprising brazing using nickel and nickel-chromium based filler metals. While it is to be understood that any reduction in nickel leaching, particularly into a liquid such as water is to be considered to fall within the scope of the present invention, a reduction on the order of at least 50%, preferably at least about 70% and most preferably a reduction of at least about 85% is attained. Such percentages are based upon a comparison of the nickel leaching rates under identical test conditions of two identical heat exchangers (or other manufactured assembly) which have been similarly manufactured, but wherein one is manufactured in a process which includes the use of Fe/Cr braze filler metal and the optional, post-brazing conditioning step described herein and the other is manufactured conventionally, such as using a Ni or Ni/Cr base braze filler metal.

It is widely understood that corrosion of metallic parts is a consequence of galvanic action. Corrosion is manifested in a variety of forms of degradation. The attack may occur over a large part of a given surface, or it may be localized in a region, such as the region in and around a brazement. Advantageously, the manufactured assemblies and heat exchangers of the invention exhibit good general corrosion resistance. That is, these assemblies are resistant to a wide variety of localized and generalized manifestations of corrosion, including generalized or localized removal of material, surface oxidation, rusting, pitting, and the like. The particular mechanism that operates in a given situation depends on the materials used in constructing an assembly, the materials to which the assembly is exposed, and the time, temperature, and duration of that exposure. In particular, manufactured assemblies, and especially heat exchangers constructed according to the methods described herein are characterized by superior resistance to corrosion in water-based fluids when compared to assemblies constructed using copper based filler metals. While it is to be understood that any improvement in resistance to corrosion is to be considered to fall within the scope of the present invention, a reduction on the order of at least 20%, preferably at least about 40% and most preferably a reduction of at least about 60% is attained. Such percentages are based upon a comparison of the corrosion rates under identical test conditions of two identical heat exchangers (or other manufactured assembly) which have been similarly manufactured, but wherein one is manufactured in a process which includes the use of Fe/Cr braze filler metal and the optional, post-brazing conditioning step described herein and the other is manufactured conventionally, such as using a Cu base braze filler metal.

The general corrosion resistance of the heat exchangers and other assemblies produced according to the process described herein advantageously leads to a substantially longer expected service life of the assembly. This increase not only lessens the risk of failure during operation, but also reduces the expected frequency of replacement or maintenance of such heat exchangers and other assemblies and the attendant disruption of service.

Significant fields of application wherein the inventive heat exchangers and other assemblies manufactured according to the methods described herein include the cooling of drinking water or other beverages. Of course the methods described herein can be used in manufacture of other devices or articles useful both within the technical area related to in food and beverage processing, as well as outside of this technical area.

It will be understood that the present invention has utility not only in the manufacture of heat exchangers but in any application where it is desired to reduce the amount of nickel which may leach from an assembly comprising brazed metal parts and to maintain advantageous good general corrosion resistance. More generally, the invention additionally relates to a process for joining two or more metal parts, and particularly two or more stainless steel parts, comprising the steps of: (a) juxtaposing the at least two parts to define one or more joints therebetween; (b) supplying to the one or more joints an iron/chromium brazing filler metal having a melting temperature less than that of any of the parts; (c) heating the juxtaposed parts and the brazing filler metal under appropriate conditions in order to cause the melting of the brazing filler metal; and (d) cooling the juxtaposed parts and the melted brazing filler metal to produce at least one solid brazed joint.

The method optionally includes a further step of: conditioning the brazed parts by exposing at least each of the brazed joints to an elevated temperature ranging from about 150° C. to about 600° C. in an oxygen-containing atmosphere for a sufficient time to substantially reduce the amount of nickel leaching into water or other fluids contacting the brazed joints of the brazed assembly.

Preferably the optional conditioning step is carried out in air and at a temperature between about 150° C. and 450° C.

In a preferred embodiment of the method of joining parts the iron/chromium brazing filler metal consists essentially of a composition having the formula $Fe_aCr_bCo_cNi_dMo_eW_fB_g\text{-}Si_h$ wherein the subscripts "a", "b", "c", "d", "e", "f", "g", and "h" are in atom percent and wherein, "b" ranges from about 5 to 20, "c" ranges from 0 to about 30, "d" ranges from 0 to about 20, "e" ranges from 0 to about 5, "f" ranges from 0 to about 5, "g" ranges from about 8 to 15, "h" ranges from about 8 to 15, and the sum "a"+"b"+"c"+"d"+"e"+"f"+"g"+"h"=100, the balance being incidental impurities present in an amount ranging up to about 1 percent by weight of the total composition.

The following examples are presented to provide a more complete understanding of the invention. The specific techniques, conditions, materials, proportions and reported data set forth to illustrate the principles and practice of the invention are exemplary and should not be construed as limiting the scope of the invention.

EXAMPLE 1

Preparation of Fe/Cr-base Brazing Filler Metal Strip

Strips of about 2.5 to 25 mm (about 0.10 to 1.00 inch) width and about 18 to 50 µm (about 0.0007 to 0.002 inch) thick are formed by squirting a melt of the particular composition by overpressure of argon onto a rapidly rotating copper chill wheel (surface speed about 3000 to 6000 ft/min.). Metastable, ductile, homogeneous ribbons of substantially glassy alloys consisting essentially of the compositions (atom percent) set forth in Table I are produced.

TABLE I

|  | Fe | Cr | Co | Ni | Mo | W | B | Si |
|---|---|---|---|---|---|---|---|---|
| alloy 1 | 60 | 10 | 5 | 0 | 0 | 0 | 10 | 15 |
| alloy 2 | 35 | 20 | 10 | 10 | 0 | 0 | 15 | 10 |
| alloy 3 | 53 | 5 | 0 | 20 | 0 | 0 | 8 | 14 |
| alloy 4 | 68 | 5 | 5 | 0 | 0 | 0 | 12 | 10 |
| alloy 5 | 27 | 5 | 20 | 20 | 5 | 0 | 15 | 8 |
| alloy 6 | 27 | 5 | 30 | 10 | 0 | 5 | 15 | 8 |
| alloy 7 | 63 | 10 | 5 | 0 | 0 | 0 | 12 | 10 |

EXAMPLE 2

Characterization of Fe/Cr-base Brazing Filler Metal Strip

The liquidus and solidus temperatures of selected ribbons having compositions set forth in Table I are determined by Differential Thermal Analysis (DTA) Technique. The individual samples are heated side by side with an inert reference material at a uniform rate and the temperature difference between them is measured as a function of temperature. The resulting curve, conventionally known as a thermogram, is a plot of relative changes in the temperatures of the sample and the reference materials during simultaneous heating vs. temperature, from which the beginning of melting and end of melting, which represent the solidus and liquidus temperatures, respectively, are determined. Values thus determined are set forth in Table II below.

TABLE II

|         | Solidus            | liquidus           |
|---------|--------------------|--------------------|
| alloy 1 | 1134° C. (2073° F.)| 1162° C. (2124° F.)|
| alloy 4 | 1110° C. (2030° F.)| 1174° C. (2145° F.)|
| alloy 7 | 1144° C. (2091° F.)| 1196° C. (2185° F.)|

EXAMPLE 3

Preparation and Testing of a Heat Exchanger Brazed with Fe/Cr-base Filler Metal

Three heat exchangers having substantially identical structure and of conventional plate/plate design are prepared. The heat exchangers are manufactured with type 316L stainless steel plates. A first heat exchanger (Comparative Sample #1) is used as a reference, and comprises plates of type 316L stainless steel which are brazed using a copper brazing filler metal. A second heat exchanger (Comparative Sample #2) comprising identical plates of type 316L stainless steel is brazed using a BNi-5b nickel-based amorphous brazing filler metal. According to the AWS Classification the BNi-5b filler metal has a composition (wt. %): Ni-balance to 100%, chromium-15%, silicon-7.25%, and boron about 1.40% (with up to about 1% minor impurities). This composition corresponds approximately to the formula $Ni_{65.4}Cr_{14.6}Si_{13.5}B_{6.5}$, wherein the subscripts are in atom percent. A third heat exchanger (Sample 7) is prepared by brazing its type 316L stainless steel plates with an iron/chromium brazing filler metal having a composition of alloy 7. The brazing filler metal is supplied in the form of ductile foil about 75 mm wide and about 25 μm thick that is substantially fully amorphous. All three heat exchangers are brazed in a vacuum furnace under the following conditions: #1 at less than about 1150° C. for about 30 minutes; #2 at less than about 1200° C. for 60 minutes; and #3 at less than about 1250° C. for 60 minutes. Such conditions are selected as being appropriate in order to effect a high-quality brazing using the respective brazing filler metals.

Initial testing of nickel leaching in the "as-brazed" heat exchangers is carried out according to the following protocol:

Each of two compartments of each of the as-brazed heat exchangers is rinsed with copious amounts of tap water and afterwards the two compartments are filled with tap water. The water-filled heat exchangers are allowed to stand ("stagnate") for 72 hours at room temperature. After this stagnation period, samples of water are taken from each compartment. Each of these samples is analyzed by means of inductively coupled plasma emission spectrometry to determine the nickel concentration therein. For this analysis a standard analytical instrument, an Optima 3300 DV is used. This instrument has an accuracy of ±0.002 ppm when measuring the amount of nickel in aqueous solutions.

Results of these tests show that water from heat exchanger comparative sample #1 brazed with copper exhibits a Ni concentration of less than about 25% that of comparative sample #2 brazed with B-Ni5b Ni/Cr-base filler metal, while water from heat exchanger sample #3 brazed with alloy 6, an iron/chromium-base brazing filler metal in accordance with the present invention having a composition formula $Fe_{60}Cr_5Co_{10}B_{13}Si_{12}$, exhibits a Ni concentration of less than about 75% that of comparative sample #2. The reduced concentration of Ni in water exposed to heat exchanger sample #3 demonstrates the reduction of Ni leaching attendant to the use of an Fe/Cr-base brazing filler metal in production of heat exchangers.

EXAMPLE 4

Preparation and Testing of a Heat Exchanger Brazed with Fe/Cr-base Filler Metal and Post-Treated A heat exchanger (sample #4) comprising 316L stainless steel plates of the same design as that of samples #1-#3 is constructed and brazed using an iron/chromium brazing filler metal having a composition of alloy 7. Sample #4 was brazed at a temperature less than about 1250° C. for 60 min, the same as for sample #3. After brazing, heat exchanger sample #4 is subjected to a post-treatment of being heated to a temperature of about 400° C. for about 12 h in air.

After the post-treatment exchanger sample #4 is tested for Ni leaching as in Example 1. Each of two compartments of post-treated heat exchanger #4 is rinsed with copious amounts of tap water and afterwards the two compartments are filled with tap water. The water-filled heat exchanger is allowed to stand for 72 hours at room temperature. After this stagnation period, samples of water are taken from each compartment. Each of these samples is analyzed for Ni by means of the same inductively coupled plasma emission spectrometry used in Example 1. Water from heat exchanger #4 brazed with an iron/chromium-base brazing filler metal and post-treated in accordance with the present invention exhibits a level of leached Ni about 60% that in water from heat exchanger sample #2, confirming the efficacy of the post treatment in reducing Ni leaching.

Having thus described the invention in rather full detail, it will be understood that such detail need not be strictly adhered to but that various changes and modifications may suggest themselves to one skilled in the art, all falling within the scope of the present invention as defined by the subjoined claims.

What is claimed is:

1. A method for the manufacture of heat exchangers and apparatuses having brazed parts, comprising the steps of:
   (a) juxtaposing at least two parts to define one or more joints therebetween;
   (b) supplying to said one or more joints an iron/chromium brazing filler metal;
   (c) heating said juxtaposed parts and said brazing filler metal under appropriate conditions in order to melt said brazing filler metal;
   (d) cooling said juxtaposed parts and said brazing filler metal to produce a solid brazed joint of a brazed assembly; and
   (e) conditioning said brazed parts by exposure to an elevated temperature in an oxygen-containing atmosphere for a time sufficient to substantially reduce the amount of nickel leaching into water or other fluids contacting the brazed joint of said brazed assembly.

2. A method as recited by claim 1, wherein said oxygen-containing atmosphere is air.

3. A method as recited by claim 1, wherein said elevated temperature ranges from about 300° C. to 600° C.

4. A method as recited by claim 3, wherein said elevated temperature ranges from about 350° C. to 500° C.

5. A method as recited by claim 1, wherein said time ranges from about 8 to 24 hours.

6. A method as recited by claim 1, wherein said iron/chromium brazing filler metal consists essentially of a composition having the formula $Fe_aCr_bCo_cNi_dMo_eW_fB_gSi_h$ wherein the subscripts "a", "b", "c", "d", "e", "f", "g", and "h" are in atom percent and wherein, "b" ranges from about 5 to 20, "c" ranges from 0 to about 30, "d" ranges from 0 to about 20, "e" ranges from 0 to about 5, "f" ranges from 0 to about 5, "g" ranges from about 8 to 15, "h" ranges from about 8 to 15, and the sum "a"+"b"+"c"+"d"+"e"+"f"+"g"+"h"=100, the balance being incidental impurities present in an amount up to about 1 percent by weight of the total composition.

7. A method for joining two or more metal parts to form a brazed joint in a brazed assembly, comprising the steps of:

(a) juxtaposing said parts to define one or more joints therebetween;

(b) supplying to the one or more joints an iron/chromium brazing filler metal;

(c) heating said juxtaposed parts and said brazing filler metal to melt said brazing filler metal;

(d) cooling said juxtaposed parts and said melted brazing filler metal to produce a brazed joint having brazed parts; and (e) conditioning the brazed parts by exposing said brazed joint to an elevated temperature, in an oxygen-containing atmosphere, for a sufficient time to substantially reduce the amount of nickel leaching into water or other fluids contacting the brazed joint in said brazed assembly.

8. A method as recited by claim 7, wherein the oxygen-containing atmosphere is air.

9. A method as recited by claim 7, wherein said elevated temperature ranges from about 300° C. to 600° C.

10. A method as recited by claim 9, wherein said elevated temperature ranges from about 350° C. to 500° C.

11. A method as recited by claim 7, wherein said time ranges from about 8 to 24 hours.

12. A method as recited by claim 7, wherein said iron/chromium brazing filler metal consists essentially of a composition having the formula $Fe_aCr_bCo_cNi_dMo_eW_fB_gSi_h$ wherein the subscripts "a", "b", "c", "d", "e", "f", "g", and "h" are in atom percent and wherein, "b" ranges from about 5 to 20, "c" ranges from 0 to about 30, "d" ranges from 0 to about 20, "e" ranges from 0 to about 5, "f" ranges from 0 to about 5, "g" ranges from about 8 to 15, "h" ranges from about 8 to 15, and the sum "a"+"b"+"c"+"d"+"e"+"f"+"g"+"h"=100, the balance being incidental impurities present in an amount up to about 1 percent by weight of the total composition.

13. A heat exchanger comprising at least one joint brazed with an iron/chromium brazing filler metal consisting essentially of a composition having the formula $Fe_aCr_bCo_cNi_dMo_eW_fB_gSi_h$ wherein the subscripts "a", "b", "c", "d", "e", "f", "g", and "h" are in atom percent and wherein, "b" ranges from about 5 to 20, "c" ranges from 0 to about 30, "d" ranges from 0 to about 20, "e" ranges from 0 to about 5, "f" ranges from 0 to about 5, "g" ranges from about 8 to 15, "h" ranges from about 8 to 15, and the sum "a"+"b"+"c"+"d"+"e"+"f"+"g"+"h"=100, the balance being incidental impurities present in an amount up to about 1 percent by weight of the total composition.

14. A heat exchanger comprising at least two parts forming one of a plurality of brazed joints in a brazed assembly, said heat exchanger being produced by a process comprising the steps of:

(a) juxtaposing said at least two parts to define one or more joints therebetween;

(b) supplying to said one or more joints an iron/chromium brazing filler metal;

(c) heating said juxtaposed parts and said brazing filler metal to melt the brazing filler metal;

(d) cooling said juxtaposed parts and said melted brazing filler metal to produce a brazed joint having brazed parts; and (e) conditioning the brazed parts by exposing said brazed joint to an elevated temperature, in an oxygen-containing atmosphere, for a sufficient time to substantially reduce the amount of nickel leaching into water or other fluids contacting the brazed joints of the brazed assembly.

15. A heat exchanger as recited by claim 14, wherein said iron/chromium brazing filler metal consists essentially of a composition having the formula $Fe_aCr_bCo_cNi_dMo_eW_fB_gSi_h$ wherein the subscripts "a", "b", "c", "d", "e", "f", "g", and "h" are in atom percent and wherein, "b" ranges from about 5 to 20, "c" ranges from 0 to about 30, "d" ranges from 0 to about 20, "e" ranges from 0 to about 5, "f" ranges from 0 to about 5, "g" ranges from about 8 to 15, "h" ranges from about 8 to 15, and the sum "a"+"b"+"c"+"d"+"e"+"f"+"g"+"h"=100, the balance being incidental impurities present in an amount up to about 1 percent by weight of the total composition.

16. A method for the manufacture of heat exchangers and apparatuses having brazed parts, comprising the steps of:

(a) juxtaposing at least two parts to define one or more joints therebetween;

(b) supplying to said one or more joints an iron/chromium brazing filler metal consisting essentially of a composition having the formula $Fe_aCr_bCo_cNi_dMo_eW_fB_gSi_h$ wherein the subscripts "a", "b", "c", "d", "e", "f", "g", and "h" are in atom percent and wherein, "b" ranges from about 5 to 10, "c" ranges from 0 to about 10, "d" ranges from 0 to about 10, "e" ranges from 0 to about 3, "f" ranges from 0 to about 3, "g" ranges from about 8 to 15, "h" ranges from about 8 to 15, and the sum "a"+"b"+"c"+"d"+"e"+"f"+"g"+"h"=100, the balance being incidental impurities present in an amount up to about 1 percent by weight of the total composition;

(c) heating said juxtaposed parts and said brazing filler metal under appropriate conditions in order to melt said brazing filler metal; and (d) cooling said juxtaposed parts and said brazing filler metal to produce a solid brazed joint of a brazed assembly.

17. A method as recited by claim 16, wherein said brazing filler metal is in the form of a homogeneous, ductile ribbon.

18. A method as recited by claim 16, further comprising the step of:

(e) conditioning said brazed parts by exposure to an elevated temperature in an oxygen-containing atmosphere for a time sufficient to substantially reduce the amount of nickel leaching into water or other fluids contacting the brazed joint of said brazed assembly.

* * * * *

UNITED STATES PATENT AND TRADEMARK OFFICE
CERTIFICATE OF CORRECTION

PATENT NO. : 6,883,701 B2
DATED : April 26, 2005
INVENTOR(S) : Anatol Rabinkin et al.

It is certified that error appears in the above-identified patent and that said Letters Patent is hereby corrected as shown below:

Column 14,
Line 47, before "and" insert -- the sum "g" + "h" ranges from about 18 to 25, --.

Signed and Sealed this

Thirteenth Day of December, 2005

JON W. DUDAS
*Director of the United States Patent and Trademark Office*